United States Patent [19]

Soldanski et al.

[11] Patent Number: 4,808,329

[45] Date of Patent: Feb. 28, 1989

[54] CLEANING PREPARATION FOR GLASS

[75] Inventors: Heinz-Dieter Soldanski, Essen; Marlis Kallbe, Moenchengladbach; Bernd-Dieter Holdt, Duesseldorf, all of Fed. Rep. of Germany

[73] Assignee: Henkel Kommanditgesellschaft auf Aktien, Duesseldorf, Fed. Rep. of Germany

[21] Appl. No.: 26,100

[22] Filed: Mar. 16, 1987

[30] Foreign Application Priority Data

Mar. 22, 1986 [DE] Fed. Rep. of Germany ....... 3609734

[51] Int. Cl.$^4$ ......................... C11D 7/50; C11D 7/24; C09D 9/00; C23G 5/02

[52] U.S. Cl. .................................... 252/162; 252/158; 252/159; 252/166; 252/167; 252/168; 252/170; 252/171; 252/174.15; 252/174.24; 252/DIG. 10

[58] Field of Search ............... 252/158, 159, 162, 166, 252/167, 168, 170, 171, 174.15, 174.24, DIG. 10

[56] References Cited

U.S. PATENT DOCUMENTS

| | | | |
|---|---|---|---|
| 3,249,550 | 5/1966 | Metters | 252/161 |
| 3,310,495 | 3/1967 | Masuda et al. | 252/79.1 |
| 3,696,043 | 10/1972 | Labarge et al. | 252/153 |
| 3,954,660 | 5/1976 | Kennedy et al. | 252/353 |
| 4,267,213 | 5/1981 | Beek et al. | 427/292 |
| 4,347,151 | 8/1982 | Lohr et al. | 252/163 |
| 4,347,333 | 8/1982 | Lohr et al. | 524/269 |
| 4,606,842 | 8/1986 | Keyes et al. | 252/174.23 |
| 4,689,168 | 8/1987 | Reguejo | 252/171 |

FOREIGN PATENT DOCUMENTS

| | | | |
|---|---|---|---|
| 726668 | 1/1966 | Canada | 252/159 |
| 5510269 | 8/1979 | Japan | 252/162 |
| 5918287 | 6/1983 | Japan | 252/171 |
| 2031455 | 4/1980 | United Kingdom | 252/174.25 |

OTHER PUBLICATIONS

McCutcheon's functional Materials, ©1983, p. 218.

The Chemical Formulary, H. Bennett, Editor, 1951, vol. IX, p. 515.

*Primary Examiner*—Paul Liberman
*Assistant Examiner*—Ronald A. Krasnow
*Attorney, Agent, or Firm*—Ernest G. Szoke; Henry E. Millson, Jr.; Real J. Grandmaison

[57] ABSTRACT

A paste-form glass cleaning preparation having the composition:

(a) from 2 to 30% by weight of gasoline having a boiling point in the range of from 120° to 250° C.

(b) from 0 to 10% by weight of organic solvent selected from the group consisting of alcohols, ketones and glycol ethers having a boiling point in the range of from 55° to 250° C., the organic solvent content making up less than half the gasoline content, (c) from 5 to 40% by weight of microcrystalline calcium carbonate wherein more than 98% by weight of the particles are smaller than 300 μm, (d) from 0.2 to 2.5% by weight of silicone oil having a viscosity of from 20 to 1000 mPas, (e) from 0.05 to 2% by weight of nonionic and/or anionic emulsifier for oil-in-water emulsions, (f) from 0.1 to 3% by weight of polyacrylic acid having an average molecular weight of from $0.8\times10^6$ to $5\times10^6$, (g) from 0 to 2% by weight of alkali metal selected from the group consisting of alkaline reacting alakli metal salts, ammonia and alkanolamines, (h) from 0 to 3% by weight of other standard auxiliaries, and (i) ad 100% by weight of water.

The preparation is distingushed by extremely high cleaning power and minimal residue formation and may be conveniently and cleanly handled.

14 Claims, No Drawings

CLEANING PREPARATION FOR GLASS

BACKGROUND OF THE INVENTION

1. Field of the Invention

This invention relates to a preparation for cleaning glass and ceramic surfaces, and more particularly, to such a preparation in the form of a paste having a viscosity at 20° C. of from 10,000 to 40,000 mPas.

2. Discussion of Related Art

Numerous methods and preparations have been proposed in the literature for cleaning glass surfaces. Various preparations are also available in practice for this purpose. For example, window cleaning preparations in the form of dilute aqueous surfactant solutions which may also contain volatile alkali metal salts and organic solvent are widely used. However, greasy soil and hydrophobic soil are difficult to remove with preparations of this type. Greasy and hydrophobic soil can be better removed with preparations containing polishing agents. Preparations of this type require a two-step procedure in which the preparation is first spread over and rubbed onto the glass surfaces before it is removed again, for example by rinsing off or by polishing off after drying. The disadvantage of preparations such as these is that residues of the polishes are frequently left behind on the panes themselves or in the vicinity thereof.

Therefore, an object of the present invention is to provide a preparation which has better overall properties.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, the present invention comprises a cleaning preparation for glass panes and ceramic surfaces in the form of a paste which has a viscosity at 20° C. of from 10,000 to 40,000 mPas. The preparation comprises:

(a) from 2 to 30% by weight of gasoline having a boiling point in the range of from 120° to 250° C., (b) from 0 to 10% by weight of organic solvent selected from the group consisting of alcohols, ketones and glycol ethers having a boiling point in the range of from 55° to 250° C., the organic solvent content making up less than half the gasoline content, (c) from 5 to 40% by weight of microcrystalline calcium carbonate wherein more than 98% by weight of the particles are smaller than 300 μm, (d) from 0.2 to 2.5% by weight of silicone oil having a viscosity of from 20 to 1000 mPas at about 20° C., (e) from 0.05 to 2% by weight of nonionic and/or anionic emulsifier for oil-in-water emulsions, (f) from 0.1 to 3% by weight of polyacrylic acid having an average molecular weight of from $0.8\times10^6$ to $5\times10^6$, (g) from 0 to 2% by weight of alkalizing agent selected from the group consisting of alkaline reacting alkali metal salts, ammonia and alkanolamines, (h) from 0 to 3% by weight of other standard auxillaries, and (i) ad 100% by weight of water.

The preparation according to the invention shows extremely high cleaning power, even on heavily oil- and grease-soiled glass panes, such as for example motor vehicle windshields. It may readily be applied to the glass panes without any danger of running or dripping. Despite its paste-like consistency, the preparation may be effortlessly spread over large areas. After drying, the residues may be polished off easily and with virtually no dust, leaving behind completely clear surfaces free from streaks and residues.

The individual constituents of the preparation are described in the following:

Organic solvent

The preparation preferably contains gasoline as the sole organic solvent, more especially gasoline having a boiling point in the range of from 120° to 250° C., and preferably of from 140° to 180° C. For reasons of odor, it is preferred to use dearomatized gasoline and synthetic isoparaffins.

In addition to gasoline, however, a solvent selected from the group consisting of alcohols, ketones and glycol ethers may also be used in the preparation. However, their content always makes up less than half the gasoline content. In general, the boiling point of these solvents is in the range of from 55° to 250° C. Examples of these solvents are acetone, isopropanol and ethylene glycol monobutylether.

The quantity of gasoline in the preparation is from 2 to 30% by weight, preferably from 3 to 20% by weight, and more preferably from 4 to 12% by weight. The preparation may contain from 0 to 10% by weight, and preferably from 0 to 5% by weight, of the other organic solvents mentioned.

Calcium carbonate

The calcium carbonate used as an abrasive component in the preparation is microcrystalline, natural or, preferably, synthetic calcium carbonate. Finely-divided material wherein the weight average of the particle size is from 0.2 to 10 μm is suitable. 98% by weight of the calcium carbonate should have a particle size below 300 μm, preferably below 200 μm, and more prefarably below 100 μm. The calcium carbonate content of the preparation is from 5 to 40% by weight, preferably from 10 to 30% by weight, and more preferably from 15 to 25% by weight.

Silicone oil

Low viscosity liquid silicone oils, for example polydimethyl siloxanes, having a viscosity of from 20 to 1000 mPas at about 20° C., preferably from 30 to 500 mPas, and more preferably from 50 to 100 mPas are suitable for the preparation according to the invention. Their content in the preparation is from 0.2 to 2.5% by weight, preferably from 0.3 to 1.8% by weight, and more preferably from 0.7 to 1.3% by weight.

Emulsifiers

Suitable emulsifiers include standard anionic, but preferably nonionic, emulsifiers which provide an oil-in-water emulsion. The alkali metal, ammonium, amine and alkaline-earth salts of long-chain alkyl sulfates, sulfonates and phosphoric acid partial esters may be used as anionic emulsifiers. Particularly suitable anionic emulsifiers include the salts of sulfuric acid semiesters or phosphoric acid partial esters of linear alcohols or oxoalcohols containing from 12 to 18 carbon atoms or of polyglycol monoalkylethers containing from 12 to 18 carbon atoms in the alkyl group, olefin sulfonates, ester sulfonates and alkane sulfonates containing from 12 to 20 carbon atoms, alkylbenzene sulfonates containing from 6 to 16 carbon atoms in the alkyl group, sulfonates of polyglycol monoalkylethers containing from 12 to 18 carbon atoms in the alkyl group and salts of fatty acids containing from 12 to 18 carbon atoms. Of these anionic emulsifiers, it is preferred to use fatty acid amine salts, more especially salts of alkanolamines or alkanolalkylamines containing from 2 to 7 carbon atoms.

Suitable nonionic emulsifiers include, for example, sorbitan esters of higher fatty acids and adducts of alkylene oxide with higher linear monofunctional and polyfunctional alcohols, alkylphenols, long-chain carboxylic acids, carboxylic acid amides and hydroxy fatty acids containing from 10 to 24 carbon atoms and with fatty acid glycerol or sorbitan esters. Preferred nonionic emulsifiers are the adducts of from 5 to 40 moles ethylene oxide with long-chain, more especially primary, $C_{12}$–$C_{18}$ alcohols and with fatty acid sorbitan esters. The adducts of from 5 to 20 moles of ethylene oxide with fatty acid sorbitan esters are particularly preferred.

The emulsifier content of the emulsion as a whole is generally from 0.05 to 2% by weight, preferably from 0.1 to 0.8% by weight, and more preferably from 0.15 to 0.4% by weight, irrespective of whether a single emulsifier or a mixture of several emulsifiers is used.

Polyacrylic acid

The polyacrylic acid in the preparation serves on the one hand as a consistency regulator and, on the other hand, as a suspension aid and is jointly responsible for the fact that, after it has dried, the preparation may readily be rubbed off without leaving any residue. Suitable polyacrylic acids include those having average molecular weights of from $0.8\times10^6$ to $5\times10^6$, and preferably of from $1\times10^6$ to $4\times10^6$. The polymer is preferably used in the acidic form in the production of the preparation, but is generally present in partially neutralized form in the end product. The polyacrylic acid content of the preparation is from 0.1 to 3% by weight, preferably from 0.3 to 1.5% by weight, and more preferably from 0.4 to 0.8% by weight.

Alkalizing agent

The function of the alkalizing agent is to impart to the final glass cleaning preparation, in coordination with the acids present therein, a neutral to mildly alkaline pH-value, preferably a pH-value in the range of from 7.5 to 9.5. Suitable alkalizing agents include, for example, alkaline reacting alkali metal salts, ammonia and also alkanolamines and alkanolalkylamines containing from 2 to 7 carbon atoms. The quantity of alkalizing agent is governed primarily by the quantity of polyacrylic acid in the preparation. The alkalizing agent is normally used in a quantity of no more than 2% by weight and preferably in a quantity of from 0.05 to 1% by weight.

Auxiliaries

The preparation according to the invention may also contain up to 3% by weight, but preferably no more than 1% by weight of standard auxiliaries and additives such as, for example, perfume, preservatives, salts and dyes.

In one particularly preferred embodiment, the glass cleaning preparation has the following composition:

| | |
|---|---|
| from 4 to 12% | by weight of dearomatized gasoline and/or isoparaffin having a boiling point in the range of from 140 to 180° C., |
| from 15 to 25% | by weight of microcrystalline calcium carbonate wherein 98% by weight of the particles are smaller than 100 μm, |
| from 0.7 to 1.3% | by weight of silicone oil having a viscosity of from 50 to 150 mPas, |
| from 0.15 to 0.4% | by weight of adduct of fatty acid sorbitan ester containing 5 to 20 moles of ethylene oxide, |
| from 0.4 to 0.8% | by weight of polyacrylic acid having an average molecular weight of from $1\times10^6$ to $4\times10^6$, |
| from 0.05 to 1% | by weight of alkali hydroxide, and |
| ad 100% | by weight of water. |

The preparation according to the invention is generally prepared by initially introducing water, emulsifier and, optionally, other auxiliaries and then adding the polyacrylic acid with vigorous stirring. After the polyacrylic acid has swollen, the required pH-value is adjusted with alkalizing agent and the calcium carbonate is then stirred in. Finally, a mixture of organic solvent, silicone oil and, optionally, perfume is emulsified into the aqueous phase. The production of the preparation may also be varied by first strongly alkalizing the polyacrylic acid solution before the calcium carbonate is stirred in and only then adjusting the required pH value by addition of acid. The viscosity may be determined with a Brookfield viscosimeter using the number 6 spindle at 20 r.p.m. The final paste-form preparation may be packed in cans, tubes or dispensers of various materials.

The preparation is used by spreading the product over the surface to be cleaned preferably by means of a damp cloth or damp sponge. After application, the preparation is allowed to dry and the residues remaining are then removed, for example by rubbing off with a cloth, a nonwoven or with paper. The preparation is equally suitable for cleaning surfaces of glass, glazed ceramics or enamel. However, the advantages of the preparation are particularly noticeable in the cleaning of windows and mirrors.

EXAMPLE

In a 600 liter stirrer-equipped vessel, 329 liters of water, 3.4 kg of an aqueous solution of a preservative (isothiazolone derivative, 1.5%) and 0.9 kg of an emulsifier (sorbitan monolaurate + 20 moles of ethylene oxide) were mixed, and 2.3 kg of a polyacrylic acid (average molecular weight $3\times10^6$) was slowly added to the resulting mixture with vigorous stirring. After a swelling time of about 30 minutes, 4.5 kg of a 10% sodium hydroxide solution were added, after which 92 kg of a finely divided synthetic calcium carbonate (microcrystalline, average particle size below 10 μm) were stirred into the now viscous solution. In the final step, the dispersion formed was stirred with a mixture of 23 kg of isoparaffin (boiling range 155° to 173° C.), 4.6 kg of silicone oil (Baysilon M 100) and 0.23 kg of perfume oil, resulting in the formation of a stable paste-form emulsion. The emulsion had a pH value of 8.1 and a viscosity of 20,000 mPas at 20° C. (as measured with a Brookfield viscosimeter, spindle 6, at 20 r.p.m.).

The percentage composition of the product was as follows:

| | % by weight |
|---|---|
| Gasoline | 5.0 |
| Calcium carbonate | 20.0 |
| Silicone oil | 1.0 |
| Emulsifier | 0.2 |
| Polyacrylic acid | 0.5 |
| NaOH | 0.1 |
| Perfume | 0.05 |
| Preservative | 0.011 |
| Water | 73.139 |
| | 100.000 |

For retailing, the preparation was packed in aluminum tubes.

In practical application, the preparation could be effortlessly spread over glass surfaces using a damp cloth. In the application of 2 g per $m^2$, a thin haze of the polish remained behind after drying and could be removed easily and completely with a dry cloth without any unpleasant dust being formed. Even oily soil was completely removed.

Equally good cleaning properties were shown by a preparation which, for otherwise the same composition, contained a ground natural calcium carbonate having an average particle size of 2.8 μm (99.9% by weight below 10 μm).

We claim:

1. A paste-form cleaning preparation for a glass, ceramic or enamel surface having a viscosity of from about 10,000 to about 40,000 mPas at about 20° C. comprising;
   (a) from about 2 to about 30% by weight of a hydrocarbon solvent having a boiling point in the range of from about 120° to about 250° C.,
   (b) from 0 to about 10% by weight of organic solvent selected from the group consisting of alcohols, ketones and glycol ethers having a boiling point in the range of from about 55° to about 250° C., the organic solvent content making up less than half the hydrocarbon solvent content,
   (c) from about 5 to about 40% by weight of microcrystalline calcium carbonate wherein more than about 98% by weight of the particles of said calcium carbonate are smaller than 300 μm,
   (d) from about 0.2 to about 2.5% by weight of silicone oil having a viscosity of from about 20 to about 1000 mPas at about 20° C.,
   (e) from about 0.05 to about 2% by weight of nonionic or anionic emulsifier for oil-in-water emulsions,
   (f) from about 0.1 to about 3% by weight of polyacrylic acid having an average molecular weight of from about $0.8\times10^6$ to about $5\times10^6$,
   (g) from 0 to about 2% by weight of alkalizing agent selected from the group consisting of alkaline reacting alkali metal salts, ammonia and alkanolamines,
   (h) from 0 to about 3% by weight other standard auxiliaries, and
   (i) ad 100% by weight of water.

2. A cleaning preparation as in claim 1 comprising
   from about 3 to about 20% by weight of component (a),
   from about 0 to about 5% by weight of component (b),
   from about 10 to about 30% by weight of component (c),
   from about 0.3 to about 1.8% by weight of component (d),
   from about 0.1 to about 0.8% by weight of component (e),
   from about 0.3 to about 1.5% by weight of component (f),
   from about 0.05 to about 1% by weight of component (g),
   from about 0 to about 1% by weight of component (h), and
   ad 100% by weight of water.

3. A cleaning preparation as in claim 1 wherein component
   (a) comprises dearomatized gasoline and/or synthetic isoparaffin having a boiling point in the range of from about 140° to about 180° C.

4. A cleaning preparation as in claim 1 wherein more than about 98% by weight of said particles of component (c) are smaller than about 200 μm.

5. A cleaning preparation as in claim 1 wherein said component (e) has a viscosity of from about 30 to about 500 mPas.

6. A cleaning preparation as in claim 1 having a pH-value in the range of from about 7.5 to about 9.5.

7. A cleaning preparation as in claim 1 comprising
   (a) from about 4 to about 12% by weight of dearomatized gasoline and/or isoparaffin having a boiling point in the range of from about 140° to about 180° C.,
   (c) from about 15 to about 25% by weight of microcrystalline calcium carbonate wherein about 98% by weight of said particles are smaller than about 100 μm,
   (d) from about 0.7 to about 1.3% by weight of silicone oil having a viscosity of from about 50 to about 150 mPas,
   (e) from about 0.15 to about 0.4% by weight of an adduct of fatty acid sorbitan ester containing about 5 to about 20 moles of ethylene oxide,
   (f) from about 0.4 to about 0.8% by weight of polyacrylic acid having an average molecular weight of from about $1\times10^6$ to about $4\times10^6$,
   (g) from about 0.05 to about 1% by weight of alkali metal hydroxide, and
   (i) ad 100% by weight of water.

8. The process of cleaing a glass, ceramic or enamel surface compromising (1) applying to said surface a paste-form cleaning preparation having a viscosity of from about 10,000 to about 40,000 mPas at about 20° C. comprising;
   (a) from about 2 to about 30% by weight of a hydrocarbon solvent having a boiling point in the range of from about 120° to about 250° C.,
   (b) from 0 to about 10% by weight of organic solvent selected from the group consisting of alcohols, ketones and glycol ethers having a boiling point in the range of from about 55° to about 250° C., the organic solvent content making up less than half the hydrocarbon solvent content,
   (c) from about 5 to about 40% by weight of microcrystalline calcium carbonate wherein more than about 98% by weight of the particles of said calcium carbonate are smaller than 300 μm,
   (d) from about 0.2 to about 2.5% by weight of silicone oil having a viscosity of from about 20 to about 1000 mPas at about 20° C., (e) from about 0.05 to about 2% by weight of non-ionic or anionic emulsifier for oil-in-water emulsions, (f) from about 0.1 to about 3% by weight of polyacrylic acid having an average molecular weight of from about $0.8 \times 10^6$ to about $5 \times 10^6$, (g) from 0 to about 2% by weight of alkalizing agent selected from the group consisting of alkaline reacting alkali metal salts, ammonia and alkanolamines, (h) from 0 to about 3% by weight other standard auxiliaries, and (i) ad 100% by weight of water, and (2) removing said preparation from said surface.

9. The process as in claim 8 wherein said preparation comprises from about 3 to about 20% by weight of component (a), from about 0 to about 5% by weight of component (b), from about 10 to about 30% by weight of component (c), from about 0.3 to about 1.8% by weight of component (d), from about 0.1 to about 0.8% by weight of component (e), from about 0.3 to about 1.5% by weight of component (f), from about 0.05 to about 1% by weight of component (g), from about 0 to about 1% by weight of component (h), and ad 100% by weight of water.

10. The process as in claim 8 wherein component (a) comprises dearomatized gasoline and/or synthetic isoparaffin having a boiling point in the range of from about 140° to about 180° C.

11. The process as in claim 8 wherein more than about 98% by weight of said particles of component (c) are smaller than about 200 μm.

12. The process as in claim 8 wherein said component (e) has a viscosity of from about 30 to about 500 mPas.

13. The process as in claim 8 wherein said preparation has a pH-value in the range of from about 7.5 to about 9.5.

14. The process as in claim 8 wherein said preparation comprises (a) from about 4 to about 12% by weight of dearomatized gasoline and/or isoparaffin having a boiling point in the range of from about 140° to about 180° C., (c) from about 15 to about 25% by weight of microcrystalline calcium carbonate wherein about 98% by weight of said particles are smaller than about 100 μm, (d) from about 0.7 to about 1.3% by weight of silicone oil having a viscosity of from about 50 to about 150 mPas, (e) from about 0.15 to about 0.4% by weight of an adduct of fatty acid sorbitan ester containing about 5 to about 20 moles of ethylene oxide, (f) from about 0.4 to about 0.8% by weight of polyacrylic acid having an average molecular weight of from about $1 \times 10^6$ to about $4 \times 10^6$, (g) from about 0.05 to about 1% by weight of alkali metal hydroxide, and (i) ad 100% by weight of water.

* * * * *

UNITED STATES PATENT AND TRADEMARK OFFICE
CERTIFICATE OF CORRECTION

PATENT NO. : 4,808,329
DATED : Feb. 28,1989
INVENTOR(S) : Heinz-Dieter Soldanski, Marlis Kalibe, Bernd-Dieter Holdt It is certified that error appears in the above-identified patent and that said Letters Patent is hereby corrected as shown below:

On the title page

The second inventor's name is misspelled as "Marlis Kallbe" and should read --Marlis Kalibe--.

Signed and Sealed this

Fifteenth Day of August, 1989

Attest:

DONALD J. QUIGG

Attesting Officer

Commissioner of Patents and Trademarks